Patented July 18, 1950

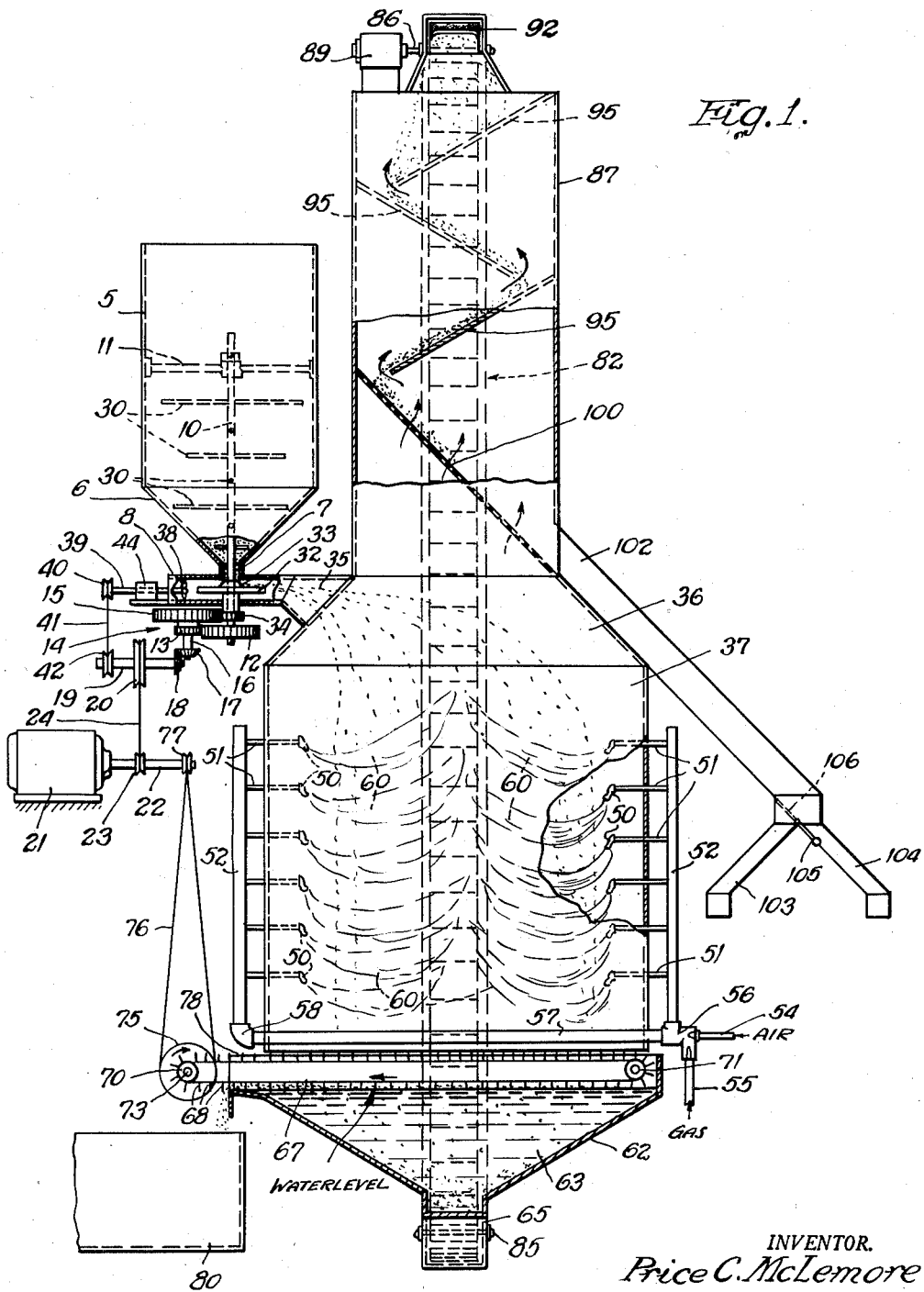

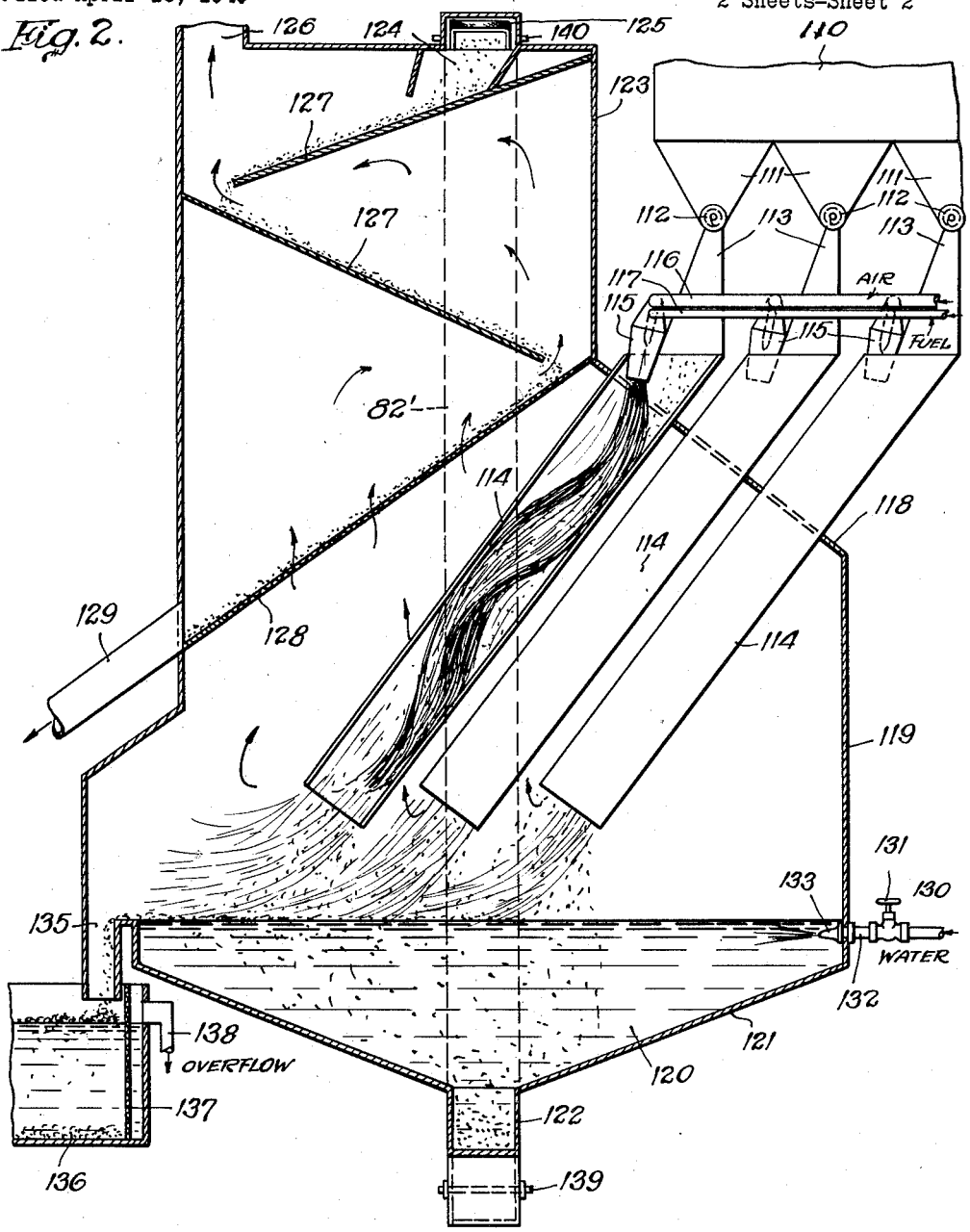

2,515,725

UNITED STATES PATENT OFFICE 2,515,725

TREATING COTTON SEED

Price C. McLemore, Montgomery, Ala., assignor to Delinted Seed Company, a corporation of Delaware Application April 16, 1945, Serial No. 588,563

11 Claims. (Cl. 47—58)

The present invention relates to a method of and apparatus for treating cotton seed.

It is an old practice in the art to delint cotton seed by acid treatment. This process has been unsatisfactory from an economic standpoint in that even if rigidly and accurately controlled only about 25% of the treated seeds will germinate satisfactorily. It has also been sought to remove excess lint by mechanical means such as a gin delinter, but removal of the lint in this manner tends to fracture or crack the hull. A yield of 35 to 40% of good seed is about the maximum of such processes.

In the acid treatment of seeds substantially all of the lint is removed. When such naked seeds are subjected to wet soil or spring rains, they tend to drown. Why this happens is not clearly understood, but the seeds seem to have a self-regulating function as to the amount of water admitted so long as the seed has a fuzzy coating. This drowning of the seeds also occurs if the hulls or shells of the seeds are cracked or fractured which is a common occurrence when the seeds are delinted mechanically.

In my earlier application Serial No. 553,820, filed September 13, 1944, now Patent No. 2,437,397, I have disclosed a method and apparatus for delinting cotton seed in which the lint of the cotton seed is wetted with an inflammable liquid, and, the lint while still wet with the liquid, is caused to be ignited to provide quick burning of the lint from the seed hull. While the method and apparatus of the aforesaid application has proved satisfactory, the use of the method and apparatus therein disclosed requires considerable caution and care since highly inflammable fluid must be sprayed upon the seed, and this spraying produces highly combustible gaseous mixtures which present a dangerous condition. Also, with my prior machine it is difficult to achieve uniform flaming of the seeds during delinting so that on some portions of the seeds the lint is entirely removed exposing or even in some instances causing fracturing of the hulls. Further, in this prior application I have disclosed a spray means for spraying a quenching fluid on the seed after the lint has been ignited which has not been totally effective in extinguishing the smoldering lint so that some of the seed which would otherwise have good germination properties is destroyed. Also my earlier method and machine make no provision for separation of poor seed from good seed i. e., seed having good germination characteristics. The method of quenching the seed of my prior application also has the further disadvantage that no step or means is provided for drying the seed after quenching, the lack of which causes some of the delinted seed to stick together and become spoiled so that the yield of good seed is reduced.

It is also known in the art that cotton seed may be delinted by subjecting it to the action of flames for burning the lint from the seed. These prior burning methods are objectionable in that they lack an effective step of controlling flaming of the lint of the seed so that too much of the lint is removed, or the hull or shell caused to crack, by too intense and prolonged heating, with the attendant disadvantages of such naked or cracked seed previously mentioned. Also, the prior methods of burning the lint from the seed do not continue treatment of the seed beyond this point as providing for separation of the good seed from the poor seed, or providing adequate means for extinguishing the burning lint of the seed.

It is an object of my present invention to avoid the above referred to objections of prior methods and apparatus and to provide an improved method and apparatus for treating seed to partially remove lint thereon by the action of a flame, and subsequent treating of the seed thus delinted to increase the yield of good cotton seed.

In order to attain the aforesaid object, I propose to provide a method of treating cotton seed which comprises the step of delinting the seed by causing the same to pass through an open flame, and immediately upon passing through the flame the step of receiving the seed in a quenching bath to extinguish the burning lint before all of it has been consumed by the flame, and to cool the seed so that the hull thereof is not cracked or the seed otherwise damaged by the heat of the flame in the delinting step. The flaming step is for the purpose of burning the cotton fibers clinging to the cotton seed so that the hulls or shells of the seeds are covered by a fuzzy coating having substantially no fibers of any appreciable length. Thus the seed as delinted according to my method keeps enough of its coating so that it can control its own moisture content for germination. It is known that cotton seed having good germination properties is of greater specific gravity than that of water, for example, so that by receiving the seed in a bath of water after being subjected to proper flaming, the seed having good germination characteristics settle to the lower end of the bath. The seeds of poor quality are of less specific gravity than that of water and will float or remain at the upper end of the bath. As the good seeds settle or collect at the lower end of the bath they are removed therefrom and introduced into a suitable heating chamber for drying. The seeds collected at the upper end of the bath are also preferably continuously removed and these seeds may be used for purposes other than germination seeds.

Two forms of apparatus in which the aforesaid method of my invention may be carried out are disclosed herein, and a preferred feature of one embodiment of the apparatus of my invention resides in providing a tank through a wall of which one or more burners extend for projecting flames interiorly of the tank and through which flames the cotton seeds are adapted to pass downwardly by the force of gravity.

A further preferred feature resides in the provision of a receptacle for supporting a quenching bath positioned to immediately receive the seeds after flaming to extinguish the burning lint, and which bath also provides for separation of a good seed from a poor seed by the relative specific gravities thereof as previously mentioned. The apparatus also comprises a heating or drying chamber for drying the seeds having good germination characteristics after they have been quenched and this chamber preferably is disposed above the burners in a position to be heated by the flames of the burners. In this manner the burners, in addition to providing a flame for delinting the cotton seed, also provide a source of heat for drying the selected good seeds.

A still further preferred feature of the first disclosed apparatus resides in the provision of a duct extending between a hopper containing the seeds to be treated, and the tank in which the flames are projected in which the duct is provided with means for delivering the seeds to the tank and in which a fan means is disposed for aiding in delivery of the seeds from the duct into the tank, which fan means also serves to prevent the flames from entering the duct and feed hopper.

A further preferred feature resides in the provision of a conveyor or elevator means for conveying the seeds collected at the lower end of the receptacle containing the bath to the heating or drying chamber for drying such seeds.

In the second form of apparatus of my invention, the seeds to be treated are projected through a metal tube into one end of which the seeds are adapted to be fed either manually or by a suitable feeding means. A burner nozzle is directed into the same end of the tube in which the seeds are fed and the burner preferably is of the atomizing or blast type using compressed air to produce a stiff blast. The tube may be of a length of 3 to 4 ft. and the flame is contained substantially within the length of the tube. The remainder of the apparatus is similar in its essential respects to the apparatus of the first referred to embodiment, and the tube in which the seeds are flame treated is projected angularly downwardly toward the bath so that they are immediately received therein. In this form of the invention the burner at the one end of the tube may, if desired, be positioned to cause a swirling or spiral current interiorly of the tube so that the seeds follow a substantial helical path around the inside wall of the tube. This causes the seed to be turned around on all sides and somewhat rubbed against the inside wall of the tube which becomes quite hot and aids in delinting the seed to the proper extent.

In order to remove the seeds of poor quality that collect at the upper end of the path, I propose to accomplish this either by the provision of a conveyor for skimming the top of the bath or to conduct such seeds away by a current in the bath carrying them outwardly thereof as they collect on the upper surface of the bath.

I have found by tests that in the treatment of cotton seed as aforesaid that a high degree of efficiency is attained, and that at least 93% of them will germinate satisfactorily.

These and other objects and advantages of my invention will be apparent from the consideration of the following detail description.

Now, in order to acquaint those skilled in the art with the manner of utilizing my invention, I shall describe in connection with the accompanying drawings certain preferred embodiments of the method of my invention, and certain preferred forms of apparatus in which the methods may be suitably carried out.

In the drawings:

Figure 1 is an elevational view of one form of apparatus embodying my invention with certain portions of the apparatus being broken away and shown in section;

Figure 2 is a vertical sectional view of a modified form of apparatus embodying my present invention with certain parts of the apparatus being shown in elevation.

The apparatus shown in the drawings are somewhat diagrammatic in character with certain supports and framework of the apparatus being eliminated from the drawings for purpose of clearness of illustration.

The apparatus shown in Figure 1 of the drawings comprises a seed hopper 5 formed of sheet metal or the like having a substantially frusto-conical lower end 6 formed with an opening 7. Cotton seeds to be treated are adapted to be placed in the hopper through the open upper end thereof and are fed through the opening 7 into the duct 8. A shaft 10 extends vertically centrally of the hopper 5 and is journaled at its upper end in a bracket 11 and at its lower end has a gear 12 fixed thereto which gear meshes with a smaller gear 13 formed as part of a compound gear 14 having a larger gear 15 at its upper portion. The compound gear 14 is carried by a shaft 16 having a bevel gear 17 fixed to the lower end thereof which bevel gear 17 meshes with a bevel gear 18 carried by a horizontally extending shaft 19 to which a pulley or sheave 20 is splined or otherwise suitably connected. An electric motor 21 adapted to be connected to a suitable source of electric power (not shown) has a driven shaft 22 extending therefrom which shaft may comprise the armature shaft of the motor or a shaft extending from a speed reducing gearing mechanism associated with the motor, and to which shaft or armature a pulley 23 is splined or otherwise suitably connected for rotation with the shaft 22. A belt 24 extends between the pulley 23 and the pulley 20 on the shaft 19 which through the bevel gearing comprising the gears 17 and 18 rotates the compound gear 14 and the small gear 13 thereof meshing with the gear 12 causes rotation of the shaft 10. A plurality of agitator arms 30 are fixed to the shaft 10 and extend at right angles thereto to assure proper feeding of the cotton seed from the hopper 5 to the duct 8. A distributing wheel means 32 is journaled on shaft 10 and is disposed within the duct 8. The distributing wheel means is formed with a shaft portion having a small gear 34 meshing with the larger gear 15 of the compound gear member 14. The wheel means 32 centrally of the upper end thereof is provided with a cone-shaped portion 33 the apex of which points toward the throat 7 at the lower end of the hopper. The wheel means 32 is adjustable lengthwise of the shaft 10 to space the cone 33 toward or away from the throat 7 of the hopper to regulate the effective area of the opening of the throat and in this manner control the amount of seed adapted to be delivered from the hopper to the wheel. The wheel 32 slings the seed through the flared opening 35 of the duct into the frustoconical upper end portion 36 of a tank 37. As shown, the gear arrangement comprising the compound gear 14 having the large and small gears 15 and 13 meshing with the small and large gears 34 and 12, respectively, provide for relatively slow rotation of the shaft 10 and agitators 30 and fast rotation of the distributing wheel means 32. Delivery of the seed through the duct 8 is also facilitated by a fan mounted on a shaft 39 extending inwardly of the outer end of the duct 8. The shaft 39 at its other end is provided with a pulley 40 which is drivingly connected by a belt 41 with a pulley 42 also carried on the shaft 19 and adapted to be rotated through the pulleys 23 and 20 drivingly connected by the belt 24 by the electric motor 21. A suitable bearing 44 is provided for rotatably supporting the shaft 39.

The tank 37 may be made of sheet metal and in its preferred form is preferably of cylindrical shape. In the form of apparatus shown in the drawing, I have provided a plurality of burners 50 which lie within the vertical wall of the tank 37 with each burner having connection by a pipe 51 with a fuel or gas manifold 52. An air pipe 54 and fuel supply pipe 55 both connected to suitable sources of supply extend to a suitable mixing chamber 56 from which the manifold 52 at the right hand side of the drawing directly extends and with the manifold 52 at the left hand end of the drawing connected by means of a pipe 57 and an elbow 58.

Suitable valve mechanism or other adjustments may be provided for adjusting the amount of air and fuel admitted to the mixing chamber 56 to provide a mixture of fuel having the desired combustion characteristics. These burners preferably are of the atomizing or blast type having the air delivered under a pressure of the order of 40 to 60 lbs. per square inch and which the fuel is ordinary tractor or Diesel fuel so that large full flames are projected into the tank to substantially fill the same. It will also be understood that any desired number and types of burners may be arranged circumferentially about the tank. As shown the flames 60 issuing from the several burners substantially fill the interior of the tank 37 so that the seed delivered from the duct into the upper frustoconical end of the tank fall by gravity through the open flames of the burners. The fan 38 in addition to assisting delivery of seed to the tank also prevents the flames from the burners from entering the duct 8. The degree and length of time to which the seeds are subjected to the open flames of the burners are determined by the height of the tank, the extent of the flames projected by each of the burners, and the number thereof so that by the time the seeds descend to the lower end of the tank 37 the lint of the seeds has been removed to a degree leaving a fuzzy coating without destruction of the hulls or shells of the seeds. A substantially frustoconical receptacle 62 is positioned with its end of largest diameter adjacent to the lower open end of tank 37, which receptacle 62 is adapted to support a quenching bath of water 63 or any other liquid suitable for the purpose of immediately receiving and quenching the lint on the seed which continues to smolder and burn.

Cotton seed having good germination characteristics are known to be of greater specific gravity than that of water, and the poor or less desirable cotton seeds have a specific gravity less than that of water so that as the seeds are received in the quenching bath of the receptacle 62, the seeds having good germination characteristics immediately settle to the bottom in the substantially channel-shaped portion 65 at the lower end of the receptacle 62. The poorer seeds will float on the top of the bath 63 or close to the surface thereof from which they may be removed by the scavenger belt 67 which is provided with a plurality of prongs 68 therealong for skimming the upper surface of the bath 63. The belt 67 is trained over a pair of sprockets 70 and 71 with the sprocket 70 constituting the driving sprocket and being keyed or journaled to a shaft 73 having fixed thereto a pulley wheel 75 which is drivingly connected by a belt 76 with a sheave or pulley 77 fixed to the outer end of the shaft 22 which is adapted to be driven by the motor 21. As shown the upper left hand end of the receptacle 62 is provided with a channel portion 78 through which the scavenger belt 67 passes and through which the seeds from the upper surface of the bath are withdrawn and deposited in a container 80 disposed below the discharge outlet formed by the channel 78. A second conveyor or elevator 82 extends vertically between an idler shaft 85 at the lower end of channel portion 65 of the receptacle 62, and a drive shaft 86 for the elevator at the upper end of a drying chamber 87 formed as a reduced cylindrical extension of the frustoconical portion 36 of the tank. The drive shaft 86, as shown, is the armature shaft of an electric motor 89 but may, if desired, be a shaft extending from a gear mechanism connected with the motor. The shaft 86 has a drive sprocket thereon there being an idler sprocket on guide sheave rotatable on shaft 85 about which the conveyor 82 is trained so that the motor 89 is adapted to drive the conveyor 82. The elevator or conveyor 82 preferably comprises a plurality of wire mesh baskets 92 which are formed to extend into the channel-shaped portion 65 of the receptacle 62 for collecting the seed collected at the lower end of the bath 63. The conveyor carries the seed outwardly of the tank 37 and upwardly to the upper open end of the heating or drying chamber 87 wherein they are dumped. The drying chamber 87, as shown, comprises an integral extension of the frustoconical portion 36 of the tank 37 and it is provided with a plurality of baffles 95 to cause the cotton seed delivered to the heating chamber to follow a zig-zag path through the upper end thereof. These baffles retard the seed caused by gravity to pass through the drying tower or chamber for a period long enough to permit the heat from the delinting chamber to remove the moisture from the seed. As shown, each of the baffles 95 is secured at one end thereof to the inside wall of the drying chamber 87 with the free end extending angularly downwardly with the free ends of the upper two baffles delivering the seed to the succeeding baffle adjacent its secured end.

A perforated grid 100 extends between the frustoconical portion 36 of the tank 37 diagonally across the lower end of the heating chamber 87 in a position to receive the seeds from the free end of the lowermost baffle 95. The openings of the grid 100 are smaller than the seeds so that the latter cannot pass or fall therethrough. The drying chamber 87 is heated by heat derived from the flames of the burners 50 so that there is a continuous flow of hot air through the grid 100 and outwardly upwardly through the open upper end of the drying chamber 87. The grid 100 delivers the seed through an opening in the lower end of the heating or drying chamber 87 to a duct 102 which at its lower end is provided with a conventional bagging device having a pair of delivery arms 103 and 104. A handle 105 is connected to a valve 106 for connecting the duct 102 with either of the delivery arms 103 and 104.

It will be understood that if desired the conveyor or elevator 82 may be driven by the motor 21, if desired, through suitable drive connections, rather than by the separate electric motor 89 provided therefor, as shown in the drawings.

Referring now to Figure 2, I have shown a modified form of apparatus in which cotton seed to be treated is placed in the hopper 110 which in the embodiment herein disclosed comprises a plurality of frustoconical bottom portions 111 each having a transverse feed screw 112 at the lower end or throat thereof for feeding the cotton seed to the chutes 113 which extend to the upper ends of each of steel cylindrical tubes 114. A plurality of burners 115 are provided one for each of the tubes 114 and the burners have connection with an air supply pipe 116 and a fuel supply pipe 117. It will be understood that in this form of the apparatus of my invention one burner 115 and one tube 114 are sufficient, and I have merely illustrated a plurality of them for increasing the capacity of the apparatus. The burners 115 are of a type for projecting a long strong flame internally of the tubes 114. The burners 115, for example, may be of the atomizing or blast type as described in connection with the burners of Figure 1. The air supplied by the pipe 116 preferably extends from a source of compressed air furnished by a suitable air compressor (not shown) for supplying air at a pressure of from 40 to 60 lbs. per square inch. A fuel supply tank (not shown) is connected with the pipe 117 and may be disposed above the supply pipe 117 so as to provide gravity feed of the fuel to the burners 115. It will be understood, however, that any suitable form of burner 115 may be provided, the only essential characteristic being that it should be capable of projecting a strong husky flame internally of the tube 114. Also, suitable valve arrangements may be provided for the fuel and air supply pipes 116 and 117 for regulating the delivery of air and fuel to the burner heads to obtain the desired combustion.

If desired the burners 115 may be mounted with their discharge nozzles directed inwardly of the tubes 114 against the side walls thereof so that the flames are projected in a helical path. With this arrangement the seeds fed into the upper ends of the tubes 114 are given a swirling action and follow a helical path so that they are turned on all sides and rubbed against the inside walls of the several tubes 114. The tubes 114 should preferably be of a length so that the flames projected by the burners are contained substantially completely within the length of the tubes. I have found that tubes of three to four feet in length and about six inches in diameter when used with a burner projecting a flame of three to four feet in length provide for proper flaming of cotton seed. These dimensions, however, may be varied depending primarily on the characteristics of a particular burner. As shown the tubes 114 extend through wall 118 of tank 119 and are inclined downwardly and terminate just above the bath of water 120 contained within the frustoconical bottom portion 121 of the tank 119.

After the seeds have passed through the tubes 114 and the flame projected therein, they are immediately received in the water bath 120 whereupon the burning lint is caused to be promptly extinguished, and, as in the embodiment of my invention first described the seeds of specific gravity greater than that of water settle to the bottom of the receptacle 121 and the seeds of less specific gravity, i. e. those having poor germination characteristics remain at the surface of the bath.

After the burners 115 have been in operation for a short time, the tubes 114 become quite hot so that the seeds are rubbed against the inside walls of the several tubes 114 when the burners 115 are positioned, as shown in the drawing. Thus, with such an arrangement a mechanical rubbing action takes place and aids in delinting the cotton seed. This whirling of the seeds in the tubes 114 is not necessary but is merely an optional method of increasing the length of the path and giving some mechanical abrasive to the lint.

In the embodiment of Figure 2, as in the embodiment of Figure 1, I have provided an elevator 82' which extends from a channel 122 formed in the lower end of the receptacle 121 to the upper end of a drying chamber or tower 123, the top wall of which is provided with an opening 124 into which buckets 125 of the conveyor discharge the seeds collected at the lower end of the bath into the upper end of the drying chamber. A flue 126 is also provided at the upper end of the drying chamber through which the hot gases generated by the several burners 115 in the tank 119 escape. A pair of baffles 127 are disposed in the upper end of the drying chamber to cause the seeds to follow a zigzag path through the hot gases passing upwardly into the drying chamber through the perforate grid 128. The upper baffle 127 is inclined angularly downwardly and its free end delivers the seed to the second or next succeeding baffle 127 at its upper end, the latter being inclined angularly downwardly in a direction opposite that of the uppermost baffle 127 to deliver the seeds to the grid 128, and which grid 128 is inclined downwardly to deliver the dry seed to the duct 129 which may have a suitable bagging device associated therewith as described in connection with Figure 1 for collecting the treated cotton seed.

The seed collected at the surface of the bath may be removed therefrom by inducing a current in the bath transversely of the receptacle 121 as by introducing water under pressure from a supply conduit 130 under control of valve 131 and which valve has connection through a pipe 132 with a discharge nozzle 133. Water discharged into the bath 120 through the nozzle 133 will induce a current in the bath transversely of the apparatus as shown in Figure 2, which current will cause the light seed collected at the top to be carried to the discharge outlet 135 at the left hand end of the apparatus, as shown in Figure 2. The receptacle 136 is positioned below the outlet 135 to receive the poor seed and is provided with a vertically extending screen 137 which separates the discharge water and seed. The water from the overflow pipe 138 may discharge to a suitable sump or may be returned to the pipe 130 for recirculation through the bath.

As previously mentioned the elevator 82' is substantially similar to that disclosed in Figure 1 and at its opposite ends it is journaled on sprockets carried by axles 139 and 140. It will be understood that a suitable driving means is incorporated with the elevator 82' and may consist of an electric motor or the like connected with either of the shafts 139 and 140 which would have a drive sprocket associated therewith for driving the elevator to raise the seed collected at the lower end of the receptacle to the upper end of the drying chamber.

In the method and apparatus of the above embodiment of my invention the good cotton seed retains enough of its coating so that it can control its own moisture content for germination.

It will be understood that various other modifications and rearrangements may be made without departing from the spirit and scope of my invention.

I claim:

1. The method of delinting cotton seed which comprises the steps of burning the lint on said seed to an extent in which a substantially predetermined amount of burning lint remains on the seed, and then immersing the seed in a quenching bath to extinguish the burning lint on the seed providing the latter when dried with a predetermined fuzzy coating of lint of an amount for good germination.

2. The method of delinting cotton seed which comprises, passing the seed through a tube having a flame projected therein to burn the lint on said seed to an extent in which a substantially predetermined amount of burning lint remains on the seed, and then immersing the seed in a quenching bath to extinguish substantially immediately the burning lint on said seed providing the latter when dried with a predetermined fuzzy coating of lint of an amount for good germination.

3. The method of delinting cotton seed which comprises propelling the seed through a tube in a spiral path by a flame projecting into the tube with said flame serving to ignite and effect burning of the lint on the seed to an extent in which a substantially predetermined amount of burning lint remains on the seed after passing through the tube, and then receiving the seed in a quenching bath to extinguish substantially immediately the burning lint on said seed providing the latter when dried with a predetermined fuzzy coating of lint of an amount for good germination.

4. In an apparatus for treating cotton seed, the combination of means including a tank open at its lower end, and burner means for projecting flames interiorly of said tank through which said seed is adapted to pass by gravity to have the lint thereon ignited and burned to an extent leaving a predetermined amount of burning lint on said seed, means for supporting a quenching bath at the lower open end of said tank to receive the seed after passing through said flame to extinguish the burning lint thereon providing said seed when dried with a predetermined fuzzy coating of lint, a drying chamber at the upper end of said tank adapted to be heated by heat derived from the flames of said burner means, and means for conveying the seed from said quenching bath into said drying chamber.

5. In an apparatus for treating cotton seed, the combination of a vertically extending tank, a plurality of burners extending through the vertical walls thereof for projecting flames interiorly of the tank and through which the seed is adapted to be passed substantially vertically downwardly by force of gravity, a receptacle at the lower end of said tank for supporting a quenching bath receiving the seed after it has passed through the flames of said bruners, a portion of said seed being of greater specific gravity than said bath whereby it is caused to settle at the lower end of said receptacle, and a second portion of said seed being of less specific gravity than said bath and remaining at the upper end thereof, a drying chamber at the upper end of said tank above said burners, a grid between said heating chamber and the upper end of said tank whereby said drying chamber is adapted to be heated by the flames of said burners, and conveyor means for conducting the seed from the lower end of said receptacle into said drying chamber to be dried therein.

6. In an apparatus for treating cotton seed, the combination of a hopper adapted to support the cotton seed, a vertically extending tank, a plurality of burners extending through a vertical wall of said tank for projecting flames interiorly thereof, a duct connecting said hopper with the upper end of said tank, means in said duct for delivering seed from said hopper to said tank, fan means in said duct for preventing flames from said tank entering said duct, said seed being adapted to pass downwardly through said tank and the flames of said burners by force of gravity, a receptacle at the lower end of said tank supporting a quenching bath receiving the seed after it has passed through the flames of said burners, a portion of said seed being of greater specific gravity than said bath whereby it is caused to settle at the lower end of said receptacle, and a second portion of said seed being of less specific gravity than said bath and remaining at the upper end thereof, a drying chamber at the upper end of said tank above said burners, a grid between the lower end of said drying chamber and the upper end of said tank whereby the drying chamber is adapted to be heated by the flames of said burners, conveyor means for conducting the seed at the lower end of the bath into said drying chamber, a plurality of baffles in said heating chamber for causing said seeds to follow a zig-zag path therethrough to said grid, said grid being inclined downwardly so that said seeds pass therealong and there being an opening at the lower end of the drying chamber at the lower end of said grid through which the seeds are adapted to pass out of said drying chamber.

7. The method of delinting cotton seed which comprises the steps of burning the lint on said seed with a flame to an extent in which a substantially predetermined amount of burning lint remains on the seed, and then immersing the seed in a quenching bath to extinguish substantially immediately the burning lint on the seed providing the latter when dried with a predetermined fuzzy coating of lint of an amount for good germination.

8. In an apparatus for delinting cotton seed the combination of a tube extending downwardly and into the upper end of which the cotton seed is adapted to be fed for passing through the tube, and a burner at said upper end of said tube for projecting a strong blast of flame substantially entirely through the tube for igniting the lint on the cotton seed, and propelling the cotton seed through the tube.

9. In an apparatus for delinting cotton seed the combination of a tube into one end of which the cotton seed is adapted to be fed for passing through the tube, and a burner at said one end of said tube for projecting a strong blast of flame substantially entirely through the tube for igniting the lint on the cotton seed, and propelling the cotton seed through the tube, and means for supporting a quenching bath at the discharge end of said tube to quench the burning lint on the seed.

10. In an apparatus for delinting cotton seed the combination of a tube mounted to extend in a direction inclined to the horizontal and into the upper end of which the seed is adapted to be fed, a burner at the upper end of said tube for projecting a strong blast of flame substantially through the entire length of said tube, said burner having its discharge end directed to project the flame in a direction crossing the axis of the tube at the upper end thereof so that the blast of flame follows a substantially helical path through the tube, said flame providing for igniting the lint on the cotton seed and for propelling the seed in the helical path of the flame in rubbing engagement with the inside wall of the tube, and means for supporting a quenching bath at the lower end of said tube for quenching the burning lint on the seed.

11. In an apparatus for delinting cotton seed a stationary hollow cylindrical tube mounted to extend in a direction inclined to the horizontal and into the upper end of which cotton seed is adapted to be fed, burner means at the upper end of said tube for projecting a strong blast of flame interiorly of the tube for substantially the entire length thereof, said burner having its discharge end directed to project the flame in a direction crossing the axis of the tube at the upper end thereof so that the blast of flame follows substantially a helical path through the tube, said blast of flame providing for carrying the seed therewith in the helical path thereof and in rubbing engagement with the inside wall of the tube.

PRICE C. McLEMORE.

REFERENCES CITED

The following references are of record in the file of this patent:

UNITED STATES PATENTS

| Number | Name | Date |
|---|---|---|
| 11,458 | Black | Aug. 1, 1854 |
| 38,723 | Beach | June 2, 1863 |
| 80,593 | Brown | Aug. 4, 1868 |
| 87,975 | Rowe | Mar. 16, 1869 |
| 458,833 | Hollingsworth et al. | Sept. 1, 1891 |
| 822,478 | Rood | June 5, 1906 |
| 1,236,690 | Dunkley | Aug. 14, 1917 |
| 1,380,859 | Baker et al. | June 7, 1921 |
| 1,937,416 | Smith | Nov. 28, 1933 |
| 1,984,237 | Southan | Dec. 11, 1934 |
| 2,158,551 | Nutter | May 16, 1939 |
| 2,240,503 | Kettenbach | May 6, 1941 |

FOREIGN PATENTS

| Number | Country | Date |
|---|---|---|
| 682 | Great Britain | of 1883 |